United States Patent
Kim et al.

(10) Patent No.: US 10,372,257 B2
(45) Date of Patent: Aug. 6, 2019

(54) LIQUID CRYSTAL DISPLAY DEVICE HAVING A COMMON VOLTAGE COMPENSATOR

(71) Applicant: LG Display Co., Ltd., Seoul (KR)

(72) Inventors: Hoon Bae Kim, Goyang-si (KR); Sun Yeop Kim, Seoul (KR); Sung Yub Lee, Seoul (KR); Seong Kyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 590 days.

(21) Appl. No.: 14/923,051

(22) Filed: Oct. 26, 2015

(65) Prior Publication Data

US 2016/0180781 A1    Jun. 23, 2016

(30) Foreign Application Priority Data

Dec. 22, 2014    (KR) .................. 10-2014-0186117

(51) Int. Cl.
*G06F 3/044*    (2006.01)
*G09G 3/36*    (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
None
See application file for complete search history.

(56) References Cited

U.S. PATENT DOCUMENTS 5,434,599 A *  7/1995  Hirai ............... G09G 3/3622
                                            345/100
6,222,516 B1 *  4/2001  Oda ................. G09G 3/3648
                                            345/100
(Continued)

FOREIGN PATENT DOCUMENTS

CN    102842280 A    12/2012
CN    103488325 A    1/2014
(Continued)

OTHER PUBLICATIONS

Machine translation of TW-201120858A (Year: 2011).*
(Continued)

*Primary Examiner* — Dorothy Harris
(74) *Attorney, Agent, or Firm* — Fenwick & West LLP

(57) ABSTRACT

A liquid crystal display device is disclosed, which may compensate for a common voltage by reflecting all of noises by which a plurality of common electrodes are affected. The liquid crystal display device comprises a liquid crystal display panel including a plurality of data lines, a plurality of gate lines crossing the data lines, and a plurality of pixels provided at crossing regions of the data lines and the gate lines and including pixel electrodes and common electrodes to which a common voltage is supplied, wherein a common electrode of the common electrodes is shared by two or more of the plurality of pixels. The liquid crystal display panel also includes a plurality of feedback lines that overlap the common electrodes, the plurality of feedback lines receiving a variation of the common voltage that is reflected by the common electrodes onto the plurality of feedback lines.

14 Claims, 7 Drawing Sheets

(51) Int. Cl.
*G06F 3/041* (2006.01)
*G02F 1/1333* (2006.01)
*G02F 1/1343* (2006.01)

(52) U.S. Cl.
CPC .......... *G06F 3/0412* (2013.01); *G06F 3/0418* (2013.01); *G09G 3/3655* (2013.01); *G02F 2001/134372* (2013.01); *G09G 2310/0291* (2013.01); *G09G 2330/06* (2013.01)

(56) References Cited

U.S. PATENT DOCUMENTS

| | | | | |
|---|---|---|---|---|
| 6,677,925 | B1* | 1/2004 | Kawaguchi | G09G 3/3655 345/55 |
| 8,537,083 | B2* | 9/2013 | Nakatsuka | G09G 3/3655 345/211 |
| 8,884,921 | B2* | 11/2014 | Kim | G06F 3/044 345/174 |
| 9,223,425 | B1* | 12/2015 | Kim | G06F 3/0412 |
| 2004/0164943 | A1* | 8/2004 | Ogawa | G09G 3/3655 345/92 |
| 2005/0253836 | A1 | 11/2005 | Kim et al. | |
| 2007/0285369 | A1 | 12/2007 | Park et al. | |
| 2012/0081320 | A1* | 4/2012 | Hwang | G06F 3/0418 345/173 |
| 2012/0218199 | A1* | 8/2012 | Kim | G06F 3/0412 345/173 |
| 2012/0242597 | A1* | 9/2012 | Hwang | G06F 3/0412 345/173 |
| 2013/0147724 | A1 | 6/2013 | Hwang et al. | |
| 2013/0328750 | A1 | 12/2013 | Moh et al. | |
| 2013/0328855 | A1* | 12/2013 | Li | G09G 3/3696 345/212 |
| 2013/0335342 | A1* | 12/2013 | Kim | G06F 3/044 345/173 |
| 2013/0335366 | A1* | 12/2013 | Lee | G06F 3/044 345/174 |
| 2014/0028535 | A1* | 1/2014 | Min | G09G 3/18 345/87 |
| 2014/0062990 | A1 | 3/2014 | Zhang | |
| 2016/0195956 | A1* | 7/2016 | Zhao | G06F 3/044 345/174 |
| 2016/0259445 | A1 | 9/2016 | Yang et al. | |
| 2016/0283000 | A1 | 9/2016 | Wang et al. | |

FOREIGN PATENT DOCUMENTS

| | | |
|---|---|---|
| CN | 104022128 A | 9/2014 |
| CN | 104035615 A | 9/2014 |
| JP | H6-186530 A | 7/1994 |
| TW | 2008-02262 A | 1/2008 |
| TW | 2009-03434 A | 1/2009 |
| TW | 2011-20858 A | 6/2011 |
| TW | 201120858 A1 * | 6/2011 |

OTHER PUBLICATIONS

State Intellectual Property Office of the People's Republic of China, First Office Action, Chinese Patent Application No. 201510762965.9, dated May 31, 2018, 11 pages.

* cited by examiner

LIQUID CRYSTAL DISPLAY DEVICE HAVING A COMMON VOLTAGE COMPENSATOR

CROSS REFERENCE TO RELATED APPLICATIONS

This application claims the benefit of the Korean Patent Application No. filed on 10-2014-0186117, Dec. 22, 2014, which is hereby incorporated by reference for all purposes as if fully set forth herein.

BACKGROUND

Field of Technology

The present disclosure relates to a liquid crystal display device.

Discussion of the Related Art

An application range of a liquid crystal display (LCD) device has been gradually increased due to the LCD device having the properties of being lightweight, having a thin profile, having low consumption power driving, etc. The liquid crystal display device has been widely used as a portable computer such as a notebook PC, an office automation device, an audio/video device, and an indoor and outdoor advertisement display device. The liquid crystal display device displays an image by controlling an electric field applied to a liquid crystal layer and modulating light entering from a backlight unit.

The liquid crystal display device includes a liquid crystal display panel provided with pixels coupled to data lines and gate lines, a data driver for supplying data voltages to the data lines, and a gate driver for supplying gate signals to the gate lines. Each of the pixels of the liquid crystal display device modulates light entering from a backlight unit by driving liquid crystals of a liquid crystal layer by an electric field between a data voltage supplied to a pixel electrode when a gate signal is supplied, and a common voltage supplied to a common electrode.

Recently, the liquid crystal display device includes a touch panel having a plurality of touch sensors that may recognize a touch of the device by a user. In this case, the liquid crystal display device serves as a touch screen device. Recently, the touch screen device has been applied to a navigator, an industrial terminal, a notebook computer, a banking automated teller machine, a monitor such as a game device, a smart phone, a tablet, a cellular phone, a MP3 player, a personal digital assistant (PDA), a personal music player (PMP), a PSP, a portable game device, a digital multimedia broadcasting (DMB) receiver, a portable terminal such as a tablet PC, and home appliances such as a refrigerator, a microwave oven, and a washing machine. Also, the touch screen device has been gradually increased in its application owing to an advantage that the touch screen device may easily be manipulated by anyone.

The touch screen device may be categorized into an on-cell type touch screen device and an in-cell type touch screen device. The on-cell type touch screen device includes a touch panel having a plurality of touch sensors arranged on a liquid crystal display panel. The in-cell type touch screen device includes a plurality of touch sensors in a liquid crystal display panel. In the in-cell type touch screen device, each of a plurality of common electrodes is connected to each of a plurality of common lines one to one, whereby touch signals are supplied to the liquid crystal display device in a sensing mode and a common voltage is supplied thereto in a display mode. For this reason, the plurality of common electrodes may serve as common electrodes in the display mode and serve as touch electrodes in the sensing mode.

Meanwhile, the common voltage may be affected by unspecified noise generated in the liquid crystal display panel, and the liquid crystal display device may include a common voltage compensation circuit for compensating for the common voltage affected by the noise. However, in the in-cell type touch screen device each of the plurality of common electrodes is connected to each of the plurality of common lines one to one, whereby a space for additionally designing feedback lines to feedback each of the plurality of common voltages is not sufficient. Therefore, a problem occurs in that it is difficult to compensate for the common voltage by reflecting all of noises that affect the plurality of common electrodes.

SUMMARY

Accordingly, the present disclosure is directed to a liquid crystal display device that substantially obviates one or more problems due to limitations and disadvantages of the related art.

An advantage of the present invention is to provide a liquid crystal display device that may compensate for a common voltage by reflecting all of noises by which a plurality of common electrodes are affected.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device, comprising: a liquid crystal display panel including a plurality of data lines that receive data voltages, a plurality of gate lines that receive gate signals, a plurality of pixels at crossing regions of the plurality of data lines and the plurality of gate lines, the plurality of pixels including pixel electrodes and common electrodes to which a common voltage is supplied, wherein a common electrode of the common electrodes is shared by two or more of the plurality of pixels. The liquid crystal display panel also includes a plurality of feedback lines that overlap the common electrodes, the plurality of feedback lines receiving a variation of the common voltage that is reflected by the common electrodes onto the plurality of feedback lines. The liquid crystal display panel further includes a common voltage compensator that compensates the common voltage based on the variation of the common voltage that is reflected onto the plurality of feedback lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorthe drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, if detailed description of elements or functions known in respect of the present invention is determined to make the subject matter of the present invention unnecessarily obscure, the detailed description will be omitted. Also, titles of elements used in the following description may be selected considering easiness of specification drafting, and may be different from those of parts of the actual product.

Figure 1:
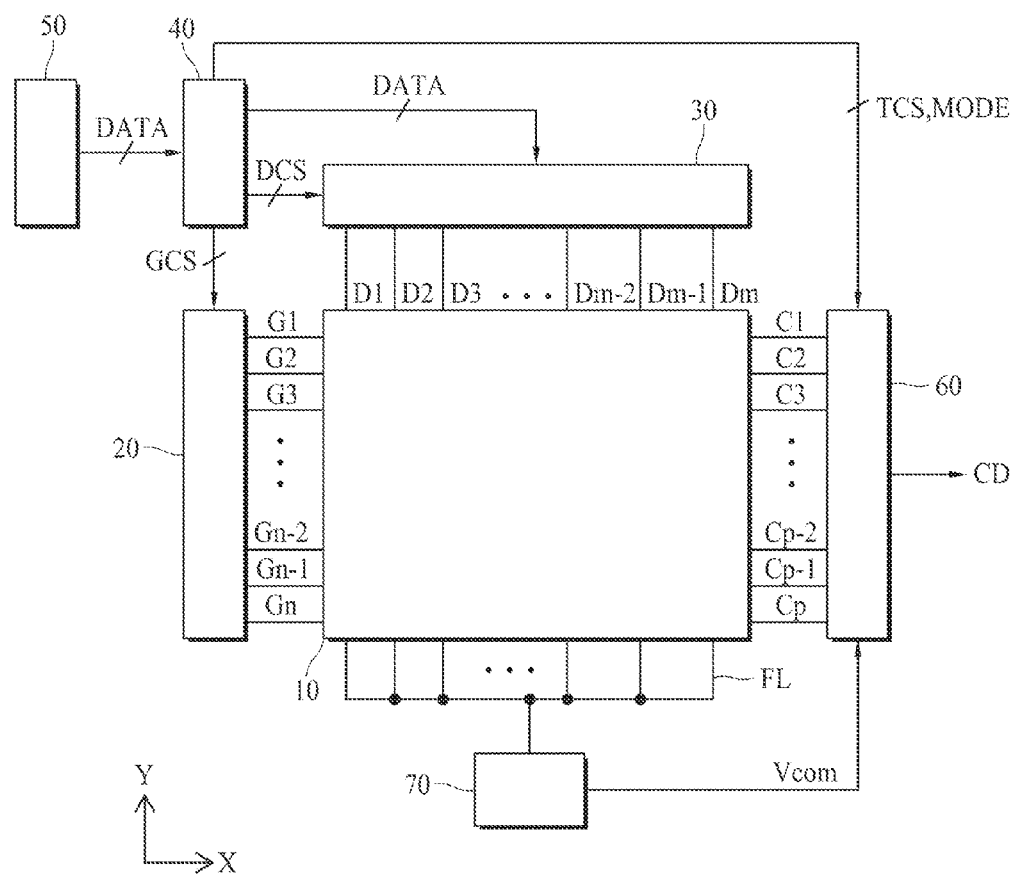
FIG. 1 is a block diagram illustrating a liquid crystal display device according to the embodiment of the present disclosure.
Figure 2:
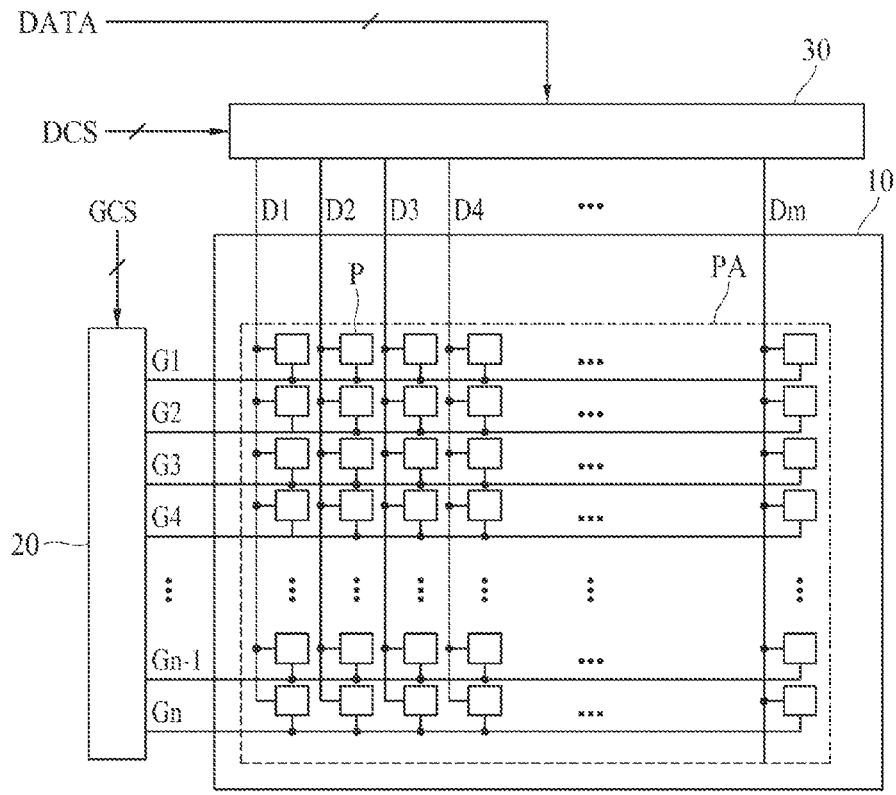
FIG. 2 is a diagram illustrating a detailed example of data lines, gate lines and pixels of a liquid crystal display panel, a gate driver and a data driver in FIG. 1 according to one embodiment.
Figure 3:
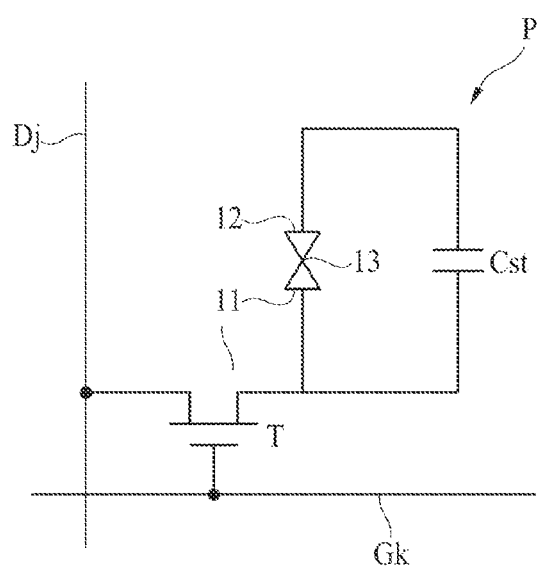
FIG. 3 is a diagram illustrating a detailed example of pixels of FIG. 2 according to one embodiment.
Figure 4:
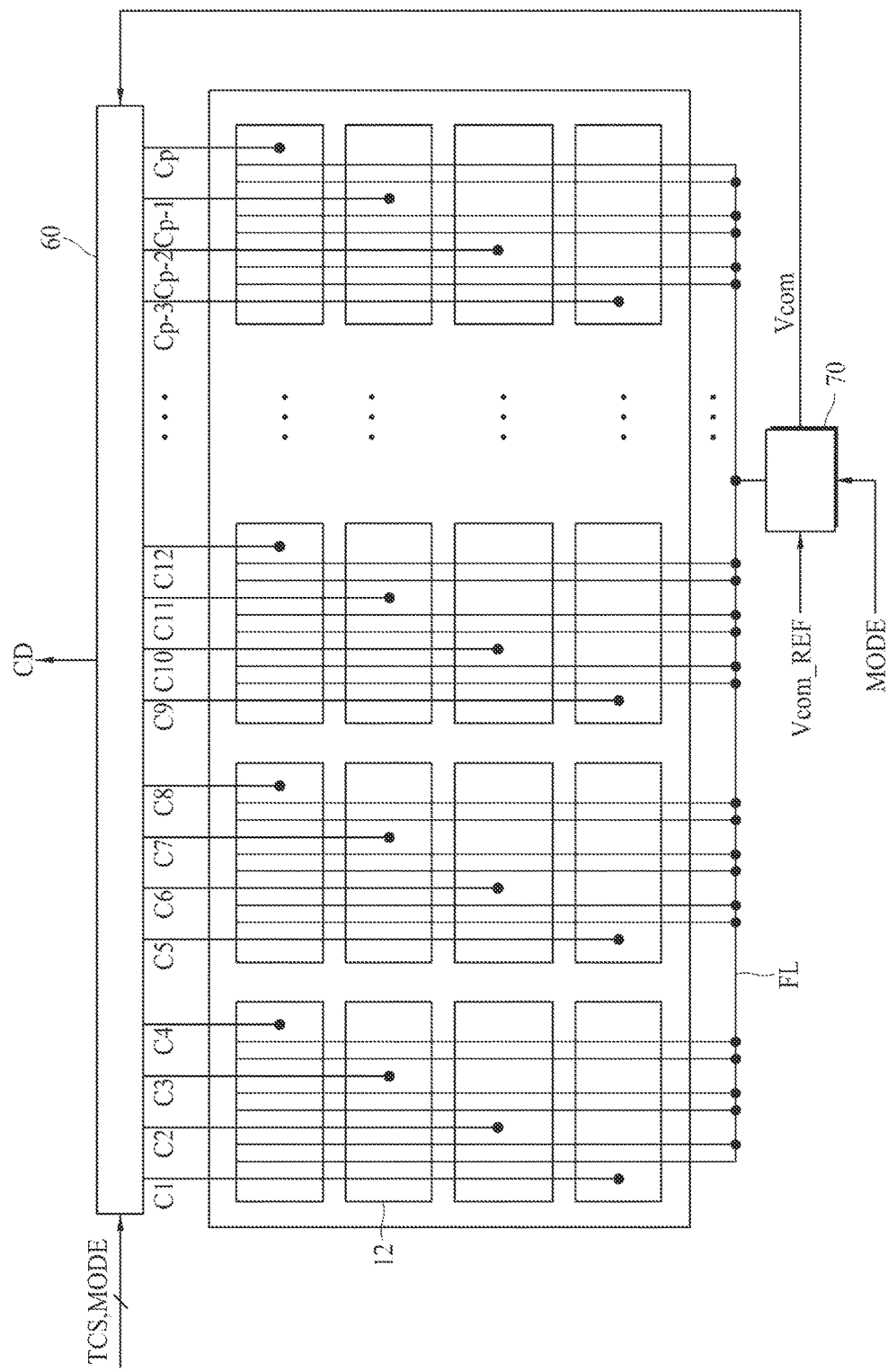
FIG. 4 is a diagram illustrating a detailed example of common electrodes, common lines, and feedback lines of a liquid crystal display panel, a touch driver, and a common voltage compensator in FIG. 1 according to one embodiment.
Figure 5:
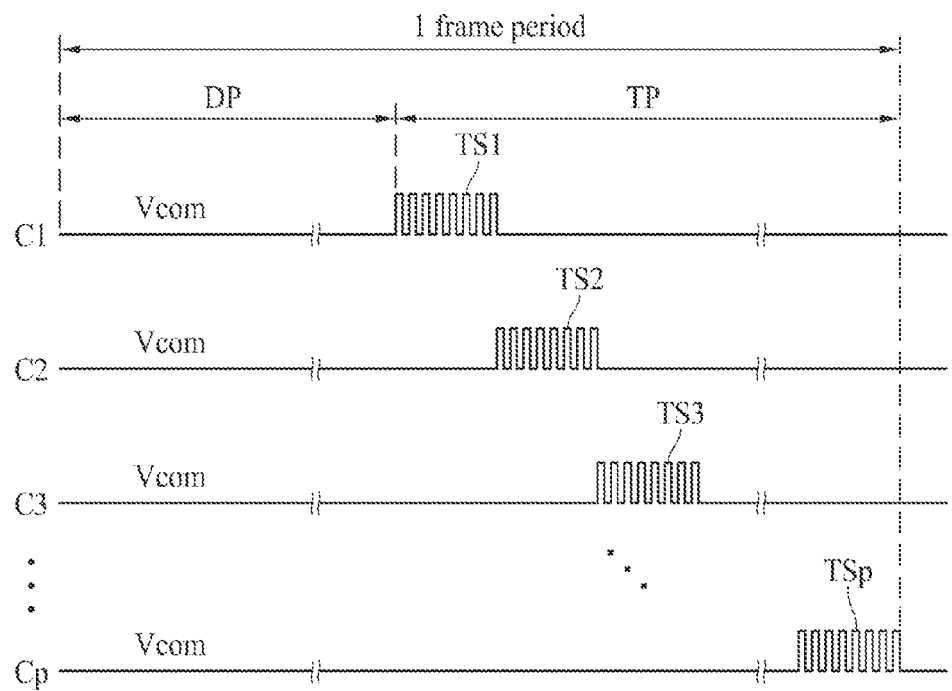
FIG. 5 is a waveform illustrating common voltages and touch signals supplied to common lines for a display period and a touch sensing period of one frame period.

FIG. 1 is a block diagram illustrating a liquid crystal display device according to the embodiment of the present disclosure. FIG. 2 is a diagram illustrating a detailed example of data lines, gate lines and pixels of a liquid crystal display panel, a gate driver and a data driver in FIG. 1 according to one embodiment. FIG. 3 is a diagram illustrating a detailed example of pixels of FIG. 2 according to one embodiment. FIG. 4 is a diagram illustrating a detailed example of common electrodes, common lines, and feedback lines of a liquid crystal display panel, a touch driver, and a common voltage compensator in FIG. 1 according to one embodiment. FIG. 5 is a waveform illustrating common voltages and touch signals supplied to common lines for a display period and a touch sensing period of one frame period. Hereinafter, a liquid crystal display device according to the embodiment of the present disclosure will be described in brief with reference to FIGS. 1 to 5.

The liquid crystal display device according to the embodiment of the present disclosure has been described based on that the liquid crystal display device is a touch screen device that may recognize a touch of a user if the user touches the liquid crystal display device. For example, the user may touch the liquid crystal display device with his orher finger or pen. Particularly, the liquid crystal display device according to the embodiment of the present disclosure has been described based on a self-capacitance method. Also, the liquid crystal display device according to the embodiment of the present disclosure divisionally drives a display driving period DP and a touch sensing period TP depending on time as shown in FIG. 5 to perform both a pixel display and a touch sensing. Although one frame period includes one display driving period DP and one touch sensing period TP in FIG. 5, it is to be understood that the embodiment of the present disclosure is not limited to the example of FIG. 5. That is, the one frame period may include a plurality of display driving periods DP and a plurality of touch sensing periods TP. Or, one frame period may include one display driving period DP and a plurality of touch sensing periods TP. Or, one frame period may include a plurality display driving period DP and one touch sensing period TP.

The liquid crystal display device according to the embodiment of the present disclosure includes a liquid crystal display panel 10, a gate driver 20, a data driver 30, a timing controller 40, a main processor 50, a touch driver 60, and a common voltage compensator 70 as shown in FIG. 1.

The liquid crystal display panel 10 (not shown) includes a lower substrate, an upper substrate, and a liquid crystal layer interposed between the lower substrate and the upper substrate. On the lower substrate of the liquid crystal display panel 10, data lines D1 to Dm (m is a positive integer greater than 2), gate lines G1 to Gn (n is a positive integer greater than 2), common lines C1 to Cp (p is a positive integer greater than 2), and feedback lines FL are formed. The data lines D1 to Dm, the feedback lines FL and the common lines C1 to Cp may cross the gate lines G1 to Gn. The feedback lines FL and the common lines C1 to Cp may be parallel to the data lines D1 to Dm.

Pixels P may be formed at crossing portions between the data lines D1 to Dm and the gate lines G1 to Gn as shown in FIG. 2. Each of the pixels P may be coupled to the data line and the gate line. Each of the pixels P may include a transistor T, a pixel electrode 11, and a storage capacitor Cst as shown in FIG. 3. The transistor T is turned on by a gate signal of the kth gate line Gk (k is a positive integer that satisfies $1 \leq k \leq n$), and supplies a data voltage of the jth data line Dj (j is a positive integer that satisfies $1 \leq j \leq m$) to the pixel electrode 11. The common electrode 12 is supplied with a common voltage from any one of the common lines C1 to Cp. For this reason, each of the pixels P may control a transmittance ratio of light entering from a backlight unit by driving liquid crystals of the liquid crystal layer 13 by an electric field generated by a difference between the data voltage supplied to the pixel electrode 11 and the common voltage supplied to the common electrode 12. As a result, the pixels P may display an image. Also, the storage capacitor Cst uniformly maintains a voltage difference between the pixel electrode 11 and the common electrode 12.

Figure 7:
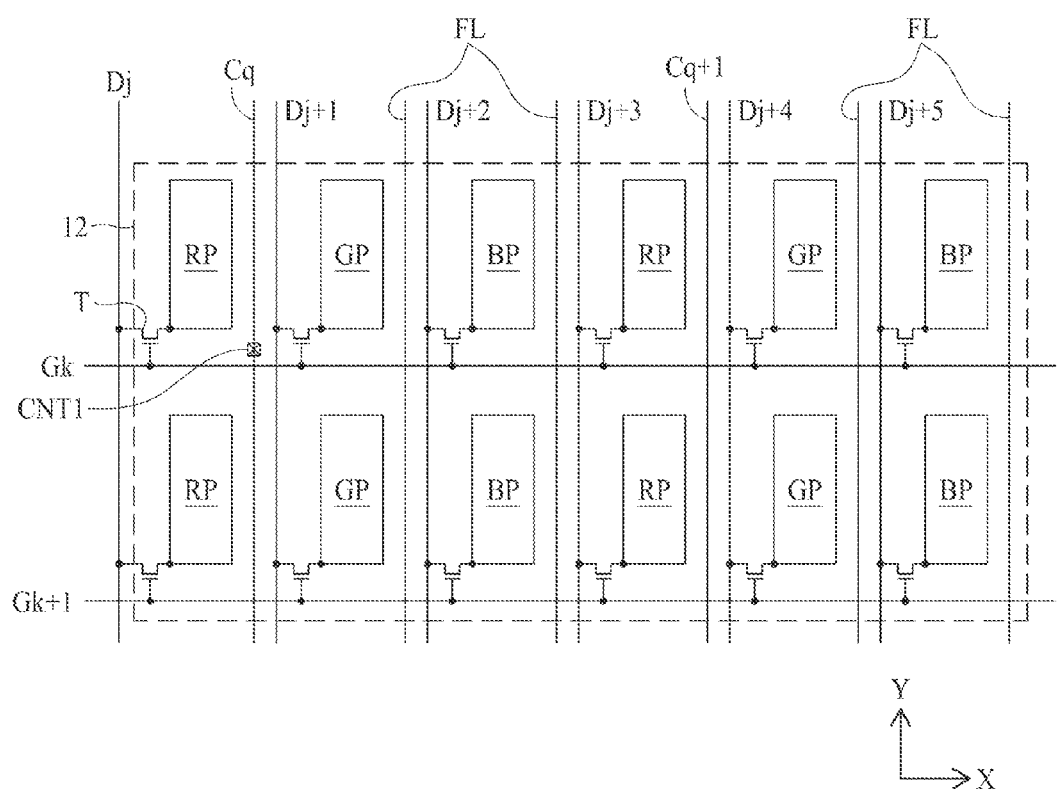
FIG. 7 is a diagram illustrating a detailed example of transistors, pixel electrodes, a common electrode, common lines and feedback lines of pixels of a liquid crystal display panel according to one embodiment.

A plurality of common electrodes 12 are formed in the liquid crystal display panel 10 as shown in FIG. 4. Each of the common electrodes 12 may function as a common electrode of the plurality of pixels as shown in FIG. 7. For example, each of the common electrodes 12 may be function as a common electrode of s number (s is a positive integer greater than 2) of pixels.

Each of the common electrodes 12 may be coupled to any one of the common lines C1 to Cp as shown in FIG. 4. Each of the common lines C1 to Cp connects each of the common electrodes 12 with the touch driver 60. Therefore, the common electrodes 12 may be supplied with the common voltage from the touch driver 60 through the common lines C1 to Cp for the display driving period DP as shown in FIG. 5, and may be supplied with touch signals for the touch sensing period TP. The common lines C1 to Cp may be arranged between two pixels adjacent to each other as shown in FIG. 7.

The feedback lines FL may be arranged between two common lines adjacent to each other as shown in FIG. 4. Although two feedback lines FL are arranged between the two common lines adjacent to each other in FIG. 4, it is to be understood that arrangement of the feedback lines FL is not limited to the example of FIG. 4. Also, each of the feedback lines FL may be arranged between two pixels adjacent to each other as shown in FIG. 7. The feedback lines FL may be grouped into one line and the one line is coupled to the common voltage compensator 70. In one embodiment, the plurality of feedback lines are a substantially same length.

Meanwhile, the common voltage Vcom is fed back to the feedback lines FL to compensate for the common voltage supplied to the common electrodes 12, thus the feedback lines FL are necessary to compensate for the common voltage. However, a space for designing the feedback lines FL may not be sufficient due to the common lines C1 to Cp.

Therefore, according to the embodiment of the present disclosure, each of the feedback lines FL is overlapped with the common electrodes 12 without being coupled to each of the common electrodes 12. The feedback lines FL may be floating lines to which no voltage is applied. Since no voltage is applied to the floating lines, the floating lines are easily affected by a voltage change of adjacent lines or electrodes. As a result, since the feedback lines FL are floating lines, each of the feedback lines FL may easily be affected by unspecified noise generated in the liquid crystal display panel 10. Particularly, if each of the feedback lines FL is overlapped with the common electrode 12 as shown in FIG. 4, each of the feedback lines is most adjacent to the common electrodes 12, whereby a common voltage variation of the common electrodes 12 may be reflected in each of the feedback lines FL by a parasitic capacitance between the common electrodes 12 and each of the feedback lines FL. In this case, since the common voltage variation affected by the unspecified noise generated in the liquid crystal display panel 10 may be input to the common voltage compensator 70 through the feedback lines FL, the common voltage compensator 70 may compensate for the common voltage by reflecting noise of the liquid crystal display panel 10.

On the upper substrate of the liquid crystal display panel 10, a black matrix and a color filter may be formed. However, if the liquid crystal display panel 10 is formed in a Color filter On TFT (COT) structure, the black matrix and the color filter may be formed on the lower substrate of the liquid crystal display panel 10.

A polarizer is attached to each of the upper substrate and the lower substrate of the liquid crystal display panel 10. An alignment film for aligning a pre-tilt angle of the liquid crystals is formed on each of the upper substrate and the lower substrate of the liquid crystal display panel 10. A column spacer for maintaining a cell gap of a liquid crystal cell is formed between the upper substrate and the lower substrate of the liquid crystal display panel 10.

A backlight unit may be arranged below a rear surface of the lower substrate of the liquid crystal display panel 10. The backlight unit may be provided in an edge type or a direct type to irradiate light toward the liquid crystal display panel 10.

The gate driver 20 generates gate signals in accordance with a gate control signal GCS input from the timing controller 40 for the display driving period DP. The gate driver 20 supplies the gate signals to the gate lines G1 to Gn in a predetermined order for the display driving period DP. The predetermined order may be a sequential order.

The data driver 30 receives digital video data DATA and a data control signal DCS from the timing controller 40 for the display driving period DP. The data driver 30 converts the digital video data DATA to analog data voltages in accordance with the data control signal DCS for the display driving period DP. The data driver 30 supplies the data voltages to the data lines D1 to Dm for the display driving period DP.

The timing controller 40 receives the digital video data DATA and timing signals from the main processor 50. The timing signals may include a vertical synchronization signal, a horizontal synchronization signal, a data enable signal, a dot clock, etc. The vertical synchronization signal is the signal for defining one frame period. The horizontal synchronization signal is the signal for defining one horizontal period to supply the data voltages to the pixels of the one horizontal line. The pixels of the one horizontal line may be coupled to the same gate line. The enable signal is the signal for defining a supply period of valid digital video data. The dot clock is the signal repeated at a predetermined short cycle.

The timing controller 40 operates the liquid crystal display device in a display mode or a sensing mode. The timing controller 40, as shown in FIG. 5, may operate the liquid crystal display device in the display mode for the display driving period DP of one frame period and operate the liquid crystal display device in the sensing mode for the touch sensing period TP. The timing controller 40 may generate a mode signal MODE for identifying the display mode from the sensing mode. In this case, the timing controller 40 may output a mode signal MODE of a first logic level voltage for the display driving period DP and output a mode signal MODE of a second logic level voltage for the touch sensing period TP.

The timing controller 40 generates a gate control signal GCS for controlling operation timing of the gate driver 20 and a data control signal for controlling operation timing of the data driver 30 based on the timing signals. The timing controller 40 generates a touch control signal TCS for controlling operation timing of the touch driver 60. For the display driving period DP, the timing controller 40 may output the gate control signal GCS to the gate driver 20 and output the digital video data DATA and the data control signal DCS to the data driver 30. The timing controller 40 may output the touch control signal TCS and the mode signal MODE to the touch driver 60. The timing controller 40 may output the mode signal MODE to the common voltage compensator 70.

The main processor 50 may be realized as a central processing unit (CPU) of any one of a navigation system, a set-top box, a DVD player, a blue ray player, a personal computer (PC), a notebook computer, a home theater system, a broadcasting receiver, a smart phone, a tablet, and a mobile terminal, a host processor, an application processor, or a graphic processing unit (GPU). The main processor 50 converts the digital video data DATA to a suitable format for display in the liquid crystal display panel 10 and transmits the converted data to the timing controller 40.

Also, the main processor 50 may receive touch coordinate data CD from the touch driver 60. The main processor 50 may run an application program associated with a coordinate, in which a touch is generated by a user, in accordance with the touch coordinate data CD. The main processor 50 may transmit the digital video data DATA and the timing signals based on the running program to the timing controller 40.

The touch driver 60 receives the touch control signal TCS and the mode signal MODE from the timing controller 40. The touch driver 60 receives the common voltage Vcom from the common voltage compensator 70.

The touch driver 60 may be operated by being divided into the display driving period DP and the touch sensing period TP in accordance with the mode signal MODE. The touch driver 60 supplies the common voltage Vcom to the common electrodes 12 through the common lines C1 to Cp for the display driving period DP as shown in FIG. 5. The touch driver 60 generates touch driving signals TS1 to TSp in accordance with the touch control signal TCS for the touch sensing period TP. The touch driver 60 supplies the touch driving signals TS1 to TSp to the common electrodes 12 through the common lines C1 to Cp for the touch sensing period TP as shown in FIG. 5.

The touch driver 60 may supply the touch driving signals TS1 to TSp to the common lines C1 to Cp in a predetermined order. If the predetermined order is a sequential order, the touch driver 60 may sequentially supply the first to pth touch driving signals TS1 to TSp to the first to pth common lines C1 to Cp.

The touch signals TS1 to TSp may include a plurality of pulses. Although the touch driving signals TS1 to TSp have a voltage higher than the common voltage Vcom in FIG. 5, it is to be understood that the touch signals are not limited to the example of FIG. 5.

The touch driver 60 receives touch sensing signals based on the touch driving signals TS1 to TSp from the common electrodes 12. The touch driver 60 may calculate touch coordinate(s) by performing operation for the touch sensing signals by using a predetermined algorithm. The touch driver 60 supplies the touch coordinate data CD, which includes the touch coordinate(s), to the main processor 50. In this case, the main processor 50 runs an application program associated with a coordinate, in which a touch is generated by a user, in accordance with the touch coordinate data CD, and transmits the digital video data DATA and the timing signals based on the running program to the timing controller 40.

The common voltage compensator 70 receives a reference common voltage from a power supply source through a reference common voltage line Vcom_REF, receives the mode signal MODE from the timing controller 40, and receives a common voltage variation of the common electrodes 12 from the feedback lines FL. The common voltage compensator 70 is operated by being divided into the display driving period DP and the touch sensing period TP in accordance with the mode signal MODE. Since the touch signals are supplied to the common electrodes 12 for the touch sensing period TP, the common voltage compensator 70 compensates for the common voltage in accordance with a voltage variation of the feedback lines FL for the display driving period DP. In more detail, the common voltage compensator 70 may output the common voltage of which common voltage variation affected by unspecified noise generated in the liquid crystal display panel 10 is compensated by inverting and amplifying the common voltage variation reflected in the feedback lines FL at the reference common voltage level Vcom_REF. A detailed description of the common voltage compensator 70 will be described later with reference to FIG. 6.

Figure 6:
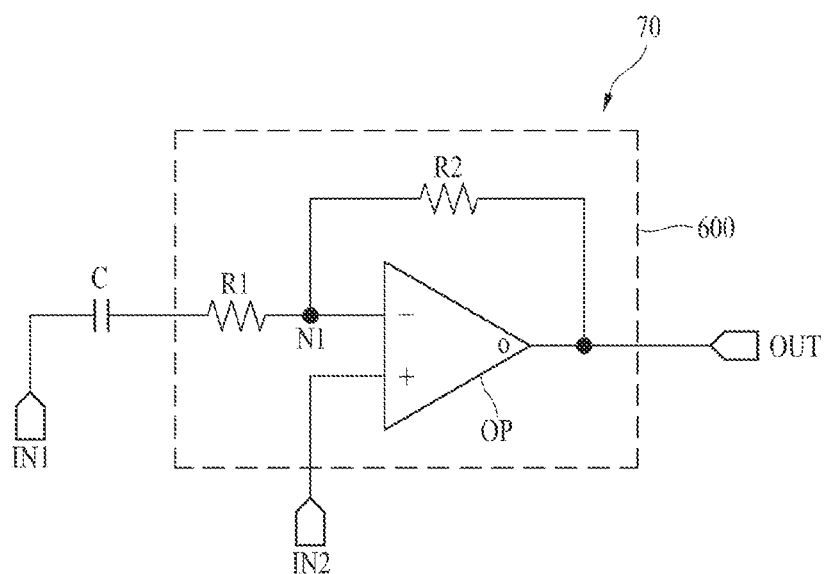
FIG. 6 is a detailed circuit diagram illustrating a common voltage compensator of FIG. 1 according to one embodiment.

FIG. 6 is a detailed circuit diagram illustrating a common voltage compensator 70 of FIG. 1 according to one embodiment. It is to be understood that the common voltage compensator 70 according to the embodiment of the present disclosure is not limited to the example shown in FIG. 6. That is, the common voltage compensator 70 may compensate for the common voltage by using another common voltage compensation circuit already known in the art.

Referring to FIG. 6, the common voltage compensator 70 may include first input terminal IN1, a second input terminal IN2, an output terminal OUT, a capacitor C, and an inversion amplifier 600.

The first input terminal IN1 is coupled to one line in which the feedback lines FL are grouped. That is, a common voltage variation of the common electrodes 12 reflected in the feedback lines FL is input to the first input terminal IN1.

The second input terminal IN2 is coupled to the reference common voltage line Vcom_REF to which the reference common voltage is applied. That is, the reference common voltage may be supplied to the second input terminal IN2. The reference common voltage is a direct current voltage input from the power supply source.

The output terminal OUT is coupled to the touch driver 60. That is, the common voltage output to the output terminal OUT is input to the touch driver 60.

The capacitor C is provided between the first input terminal IN1 and the inversion amplifier 600. The capacitor C supplies the common voltage variation input to the first input terminal IN1 to an inversion input terminal (−) of an OP-AMP (OP).

The inversion amplifier 600 may include an OP-AMP OP, a first resistor R1, and a second resistor R2. The OP-AMP OP includes a non-inversion input terminal (+), which is coupled to the second input terminal IN2, and to which the reference common voltage, that is, a direct current power voltage, is input, an inversion input terminal (−), which is coupled to the first input terminal IN1, and to which a feedback voltage is input, and an output terminal O. The first resistor R1 is coupled between the inversion input terminal (−) of the OP-AMP OP and the first input terminal IN1. The second resistor R2 is coupled between the inversion input terminal (−) of the OP-AMP OP and the output terminal. The inversion amplifier 600 inverts and compensates for the common voltage variation, which is input to the inversion input terminal (−) at the level of the reference common voltage input to the non-inversion input terminal (+) of the OP-AMP OP, in accordance with a resistance ratio of the first and second resistors R1 and R2 and then outputs the resultant value to the output terminal OUT.

As described above, since the common voltage compensator 70 according to the embodiment of the present disclosure receives the common voltage variation of the common electrodes 12, which is reflected in the feedback lines FL, the common voltage compensator 70 may compensate for the common voltage Vcom by reflecting all of noise that affect the common electrodes 12.

FIG. 7 is a diagram illustrating a detailed example of transistors, pixel electrodes, common electrodes, common lines and feedback lines of pixels of a liquid crystal display panel. For convenience of description, jth to j+5th data lines Dj to Dj+5, kth to k+1th gate lines Gk to Gk+1, and transistors T and pixel electrodes RP, GP and BP, which are provided at crossing regions of the data and gate lines, are shown in FIG. 7. Also, although FIG. 7 illustrates that the pixel electrode is any one of the pixel electrode RP of a red pixel, the pixel electrode GP of a green pixel, and the pixel electrode BP of a blue pixel, it is to be understood that the pixel electrode is not limited to the example of FIG. 7. Meanwhile, the pixel electrode RP of the red pixel, the pixel electrode GP of the green pixel, and the pixel electrode BP of the blue pixel may be disposed repeatedly in due order along a horizontal direction (x-axis direction) as shown in FIG. 7.

Referring to FIG. 7, each of the pixels includes a transistor T and a pixel electrode RP, GP or BP. The transistor T is turned on by a gate signal supplied to the gate line, and supplies a data voltage of the data line to the pixel electrode RP, GP or BP. The gate electrode of the transistor T may be coupled to the gate line, its source electrode may be coupled to the data line, and its drain electrode may be coupled to the pixel electrodes RP, GP and BP. The pixel electrode RP, GP or BP are supplied with the data voltage through the transistor T. Liquid crystals of the liquid crystal layer 13 may be driven by an electric field generated by a difference between the data voltage of the pixel electrode RP, GP or BP and the common voltage of the common electrodes 12, whereby a transmittance ratio of light entering from the backlight unit may be controlled.

Figure 9:
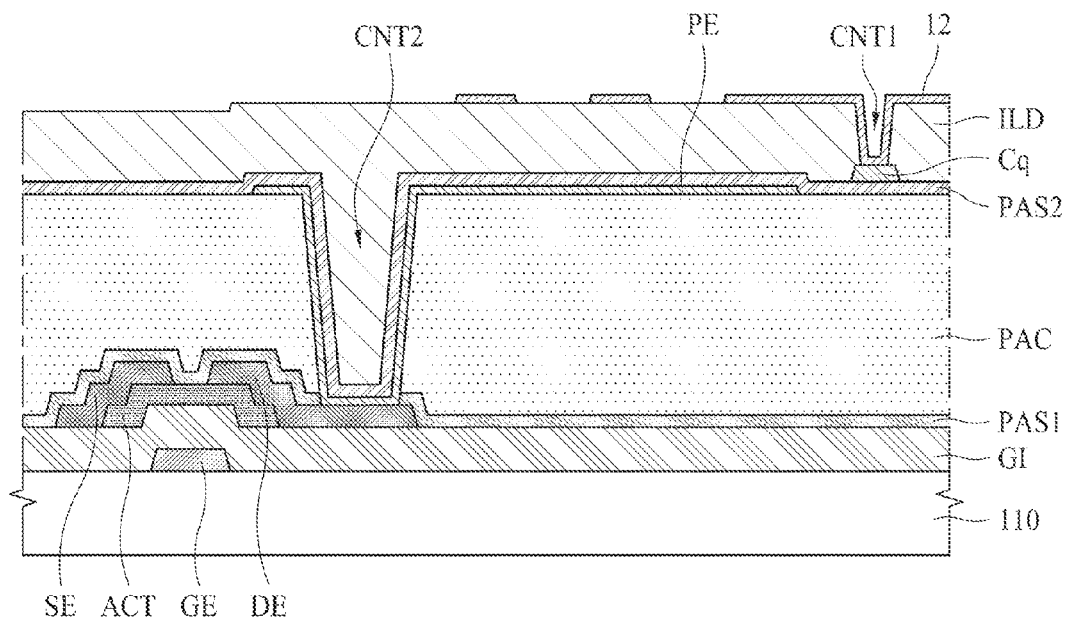
FIG. 9 is a cross-sectional diagram taken along line I-I' of FIG. 8 according to one embodiment.

The common electrode 12 may function as a common electrode of s number of pixels. The common electrode 12 may be formed overlapped with pixel electrodes of the number pixels as shown in FIG. 7. Although FIG. 7 illustrates that the common electrode 12 are overlapped with pixel electrodes of twelve pixels, it is to be understood that the common electrode is not limited to the example of FIG. 7. The common electrode 12 may be coupled to the qth common line Cq through a first contact hole CNT1 as shown in FIG. 7. The first contact hole CNT1 is the hole for exposing the qth common line Cq through a second passivation film PAS2 as shown in FIG. 9. The other common line Cq+1 which is not coupled to the common electrode 12 may be overlapped with the common electrode 12.

Each of the common lines Cq and Cq+1 may be arranged between two neighboring pixel electrodes of the pixel electrodes RP, GP and BP. For example, each of the common lines Cq and Cq+1 may be arranged between the pixel electrode RP of the red pixel and the pixel electrode GP of the green pixel as shown in FIG. 7. However, the embodiment of the present invention is not limited to the example of FIG. 7, and arrangement of the common lines Cq and Cq+1 may be varied depending on the number of common lines Cq and Cq+1. The number of the common lines Cq and Cq+1 depends on the number of common electrodes 12. That is, if all of the common lines Cq and Cq+1 are not arranged between each pair of the pixel electrode RP of the red pixel and the pixel electrode GP of the green pixel, the common lines Cq and Cq+1 may be arranged between the pixel electrode GP of the green pixel and the pixel electrode BP of the blue pixel or between the pixel electrode BP of the blue pixel and the pixel electrode RP of the red pixel. Alternatively, the common lines Cq and Cq+1 may be arranged between some of the pixel electrode RP of the red pixel and the pixel electrode GP of the green pixel.

The feedback lines FL may be arranged between two common lines Cq and Cq+1 adjacent to each other. For example, two feedback lines FL may be arranged between the qth and q+1th common lines Cq and Cq+1 as shown in FIG. 7. However, the embodiment of the present disclosure is not limited to the example of FIG. 7, and arrangement of the feedback lines FL may be varied depending on the number of common lines Cq and Cq+1 and the number of feedback lines FL. This is because a space for designing the feedback lines FL is not sufficient if the number of common lines Cq and Cq+1 is increased. For example, if the number of common lines Cq and Cq+1 is more than the number of feedback lines FL, one feedback line FL may be arranged between the two common lines Cq and Cq+1 adjacent to each other. Also, if the number of feedback lines FL is more than the number of common lines Cq and Cq+1, two or more feedback lines FL may be arranged between the two common lines Cq and Cq+1 adjacent to each other.

Each of the feedback lines FL may be arranged between two neighboring pixel electrodes of the pixel electrodes RP, GP and BP. For example, each of the feedback lines FL may be arranged between each pair of the pixel electrode GP of the green pixel and the pixel electrode BP of the blue pixel and between each pair of the pixel electrode BP of the blue pixel and the pixel electrode RP of the red pixel as shown in FIG. 7. However, the embodiment of the present disclosure is not limited to the example of FIG. 7, and arrangement of the feedback lines FL may be varied depending on the number of common lines Cq and Cq+1 and the number of feedback lines FL. This is because a space for designing the feedback lines FL is not sufficient if the number of common lines Cq and Cq+1 is increased. For example, if the number of common lines Cq and Cq+1 is more than the number of feedback lines FL, each of the feedback lines FL may be arranged between each pair of the pixel electrode GP of the green pixel and the pixel electrode BP of the blue pixel or between each pair of the pixel electrode BP of the blue pixel and the pixel electrode RP of the red pixel. Also, if the number of feedback lines FL is more than the number of common lines Cq and Cq+1, each of the feedback lines FL may be arranged between each pair of the pixel electrode GP of the green pixel and the pixel electrode BP of the blue pixel and between each pair of the pixel electrode BP of the blue pixel and the pixel electrode RP of the red pixel.

Each of the feedback lines FL may be overlapped with the common electrodes 12. Also, the feedback lines FL may be floating lines to which no voltage is applied. Therefore, the common voltage variation may be reflected in the feedback lines FL if the common voltage of the common electrodes 12 is varied. Particularly, if each of the feedback lines FL is overlapped with the common electrode 12 as shown in FIG. 7, the feedback lines are most adjacent to the common electrodes 12, whereby the common voltage variation of the common electrodes 12 may be reflected in the feedback lines FL.

Also, in one embodiment the feedback lines FL cross the gate lines Gk and Gk+1. Since the gate signals are supplied to the gate lines Gk and Gk+1 in a predetermined order, it is likely that the common electrode 12 overlapped with the gate line to which the gate signals are applied may be affected by the gate signals or the data voltage supplied to the pixel electrode. Therefore, if the feedback lines FL are designed to cross the gate lines Gk and Gk+1, the common voltage variation of the common electrode 12 may be reflected in the feedback lines FL when the gate signals are applied. Therefore, the common voltage compensator 70 may output the common voltage Vcom of which common voltage variation reflected in the feedback lines FL is compensated.

As described above, since the space for designing the feedback lines FL is not sufficient if the number of common lines Cq and Cq+1 is increased, in the embodiment of the present disclosure, each of the feedback lines FL is overlapped with the common electrodes 12 without being coupled to each of the common electrodes 12. For this reason, the common voltage variation of the common electrode 12 may be reflected in the feedback lines FL by parasitic capacitance between the common electrode 12 and the feedback lines FL.

Figure 8:
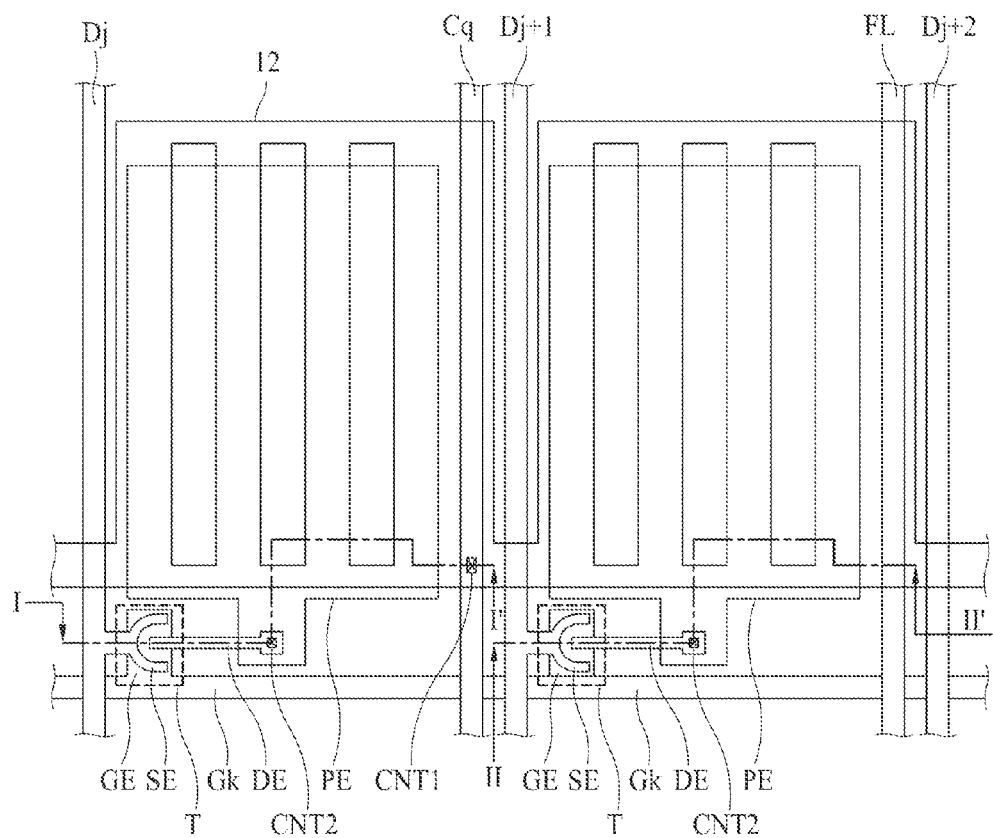
FIG. 8 is a detailed enlarged diagram illustrating pixels coupled to a jth data line, a j+1th data line and a kth gate line of FIG. 7 according to one embodiment.
Figure 10:
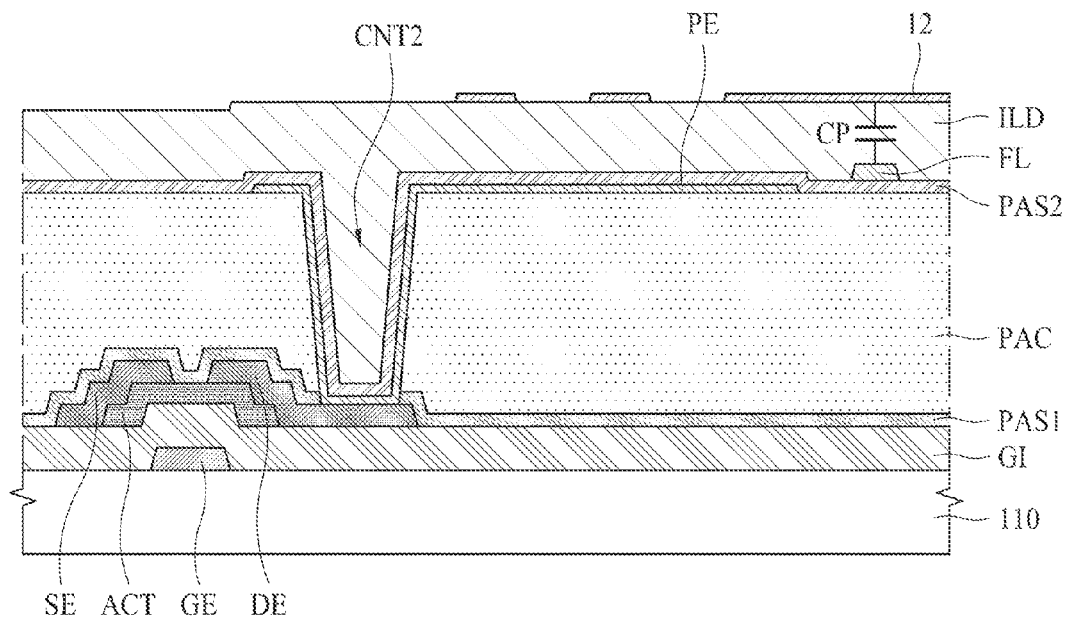
FIG. 10 is a cross-sectional diagram taken along line II-II' of FIG. 8 according to one embodiment.

FIG. 8 is an enlarged diagram specifically illustrating pixels connected to a jth data line, a j+1th data line and a kth gate line of FIG. 7 according to one embodiment. FIG. 9 is a cross-sectional diagram taken along line I-I' of FIG. 8 according to one embodiment. FIG. 10 is a cross-sectional diagram taken along line II-II' of FIG. 8 according to one embodiment. In FIGS. 8 to 11, the liquid crystal display panel 10 according to the embodiment of the present disclosure is provided in a horizontal electric field driving mode such as an in-plane switching (IPS) mode or a fringe field switching (FFS) mode. However, it is to be understood that the embodiment of the present disclosure is not limited to the examples of FIGS. 8 to 11. Hereinafter, connection between the qth common line Cq and the common electrode 12, and the feedback lines FL according to the embodiment of the present invention will be described in detail with reference to FIGS. 8 to 10.

Referring to FIGS. 8 to 10, a gate metal layer, which includes a gate electrode GE of a transistor T, is formed on a lower substrate 110. The gate metal layer may be formed of molybdenum (Mo). The gate metal layer may be formed on a buffer layer (not shown) of the lower substrate 110. The gate metal layer may be defined as a first metal layer.

A gate insulating film GI is formed on the first metal layer. The gate insulating film GI may be formed of silicon nitride (SiNx).

A semiconductor layer ACT of the transistor T is formed on the gate insulating film GI. The semiconductor layer ACT is formed to overlap the gate electrode GE. The semiconductor layer ACT may be formed of any one of a-Si, oxide semiconductor, and polysilicon. The first metal layer and the semiconductor layer ACT are insulated from each other by the gate insulating film GI.

A source/drain metal layer, which includes the jth and j+1th data lines Dj and Dj+1 and source electrode SE and drain electrode DE of the transistor T, is formed on the semiconductor layer ACT. The source/drain metal layer may be formed of a three-layered structure of Ti/Al/Ti. The source/drain metal layer may be defined as a second metal layer.

A first passivation film PAS1 and a planarization film PAC may sequentially be formed on the semiconductor layer ACT and the second metal layer. The first passivation film PAS1 may be formed of SiNx. The planarization film PAC may be formed of photo acryl.

A first transparent electrode layer, which includes a pixel electrode PE, is formed on the planarization film PAC. The first transparent electrode layer may be formed of any one of ITO and IZO. The first transparent electrode layer and the second metal layer are insulated from each other by the first passivation film PAS1 and the planarization film PAC. However, the pixel electrode PE is connected with the drain electrode DE of the transistor T through a second contact hole CNT2. The second contact hole CNT2 exposes the drain electrode DE of the transistor T by passing through the first passivation film PAS1 and the planarization film PAC.

A second passivation film PAS2 is formed on the first transparent electrode layer. The second passivation film PAS2 may be formed of SiNx.

A third metal layer, which includes the qth common line Cq and the feedback line FL, may be formed on the second passivation film PAS2. The first transparent electrode layer and the third metal layer are insulated from each other by the second passivation film PAS2.

An inter layer dielectric ILD may be formed on the third metal layer. The inter layer dielectric ILD may be formed of SiNx.

A second transparent electrode layer, which includes the common electrode 12, is formed on the inter layer dielectric ILD. The second transparent electrode layer may be formed of any one of ITO and IZO. The second transparent electrode layer and the third metal layer are insulated from each other by the inter layer dielectric ILD. Since the common electrode 12 and the qth common line Cq are provided on their respective metal layers different from each other, the common electrode 12 and the qth common line Cq are connected with each other through a first contact hole CNT1. The first contact hole CNT1 exposes the qth common line Cq by passing through the inter layer dielectric ILD. The common electrode 12 is formed to overlap the pixel electrode PE, and may include predetermined holes for exposing the pixel electrode PE to form a horizontal electric field with the pixel electrode PE.

Meanwhile, since the feedback line FL is not connected with another electrode or line as shown in FIG. 10, the feedback line FL is subjected to floating. Also, since the feedback line FL overlaps the common electrode 12 as shown in FIG. 10, parasitic capacitance Cp may exist between the feedback line FL and the common electrode 12. For this reason, if the common voltage of the common electrode 12 is varied by unspecified noise generated in the liquid crystal display panel 10, the common voltage of the common electrode 12 may be reflected in the feedback line FL by parasitic capacitance Cp. Particularly, in the embodiment of the present disclosure, since the feedback lines FL are formed to overlap all the common electrodes 12, the common voltage may be compensated by reflecting all of noises that affect the common electrodes 12.

As described above, according to the embodiment of the present disclosure, the following advantage may be obtained.

According to the embodiment of the present disclosure, the feedback lines are provided to overlap the plurality of common electrodes. As a result, if the common voltage of the common electrodes is varied by noise, the common voltage variation of the common electrodes may be reflected in the feedback lines. Therefore, according to the embodiment of the present disclosure, the common voltage may be compensated by reflecting all of noises that affect the common electrodes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-cell type touch liquid crystal display device comprising:
   an in-cell type touch liquid crystal display panel including:
      a plurality of data lines that receive data voltages;

a plurality of gate lines that receive gate signals;

a plurality of pixels at crossing regions of the plurality of data lines and the plurality of gate lines, each of the plurality of pixels including one pixel electrode;

a plurality of common electrodes supplied with a common voltage, wherein each of the common electrodes is shared by some neighboring pixels, and the pixels are grouped by the common electrodes;

a plurality of common lines supplying the common voltage to the common electrodes, wherein one of the common lines is connected to one of the common electrodes; and a plurality of feedback lines that overlap the common electrodes, the plurality of feedback lines receiving a variation of the common voltage that is reflected by the common electrodes onto the plurality of feedback lines, wherein each of the plurality of feedback lines is provided between two adjacent pixel electrodes and is parallel to adjacent common lines; and a common voltage compensator that compensates the common voltage based on the variation of the common voltage that is reflected onto the plurality of feedback lines.

2. The in-cell type touch liquid crystal display device of claim 1, wherein each of the shared common electrodes are overlapped with pixel electrodes of the some of the plurality of pixels.

3. The in-cell type touch liquid crystal display device of claim 1, wherein the plurality of feedback lines cross the plurality of gate lines.

4. The in-cell type touch liquid crystal display device of claim 1, wherein the plurality of feedback lines are floating such that a voltage is not applied to the plurality of feedback lines.

5. The in-cell type touch liquid crystal display device of claim 4, wherein each of the plurality of feedback lines includes a first end and a second end, the first ends of the plurality of feedback lines are floating and the second ends of the plurality of feedback lines are connected together, and the variation of the common voltage is input to the common voltage compensator via the second ends of the plurality of feedback lines.

6. The in-cell type touch liquid crystal display device of claim 5, wherein the variation of the common voltage of the common electrodes is reflected in each of the feedback lines by a parasitic capacitance between the common electrodes and each of the feedback lines.

7. The in-cell type touch liquid crystal display device of claim 1, wherein one or more of the plurality of feedback lines is arranged between a pair of adjacent common lines.

8. The in-cell type touch liquid crystal display device of claim 7, wherein each common line is positioned between two adjacent pixel electrodes.

9. The in-cell type touch liquid crystal display device of claim 7, wherein each common electrode is coupled to a common line through a contact hole that exposes the common line.

10. The in-cell type touch liquid crystal display device of claim 7, further comprising:

a data driver that supplies the data voltages to the plurality of data lines during a display mode of the display device;

a gate driver that supplies the gate signals to the plurality of gate lines in a pre-determined order during the display mode of the display device; and a touch driver that supplies the common voltage to the common lines during the display mode of the display device and supplies touch driving signals to the common lines during a touch mode of the display device, wherein the display mode is non-overlapping with the touch mode.

11. The in-cell type touch liquid crystal display device of claim 7, wherein the plurality of gate lines are provided in a first metal layer, the plurality of data lines are provided in a second metal layer on a gate insulating film that covers the first metal layer, the pixel electrodes are provided in a first transparent electrode layer on a planarization film that covers the second metal layer, the common lines and the plurality of feedback lines are provided in a third metal layer on a second passivation film that covers the first transparent electrode layer, and the common electrodes are provided in a second transparent electrode layer on an inter layer dielectric that covers the third metal layer.

12. The in-cell type touch liquid crystal display device of claim 7, wherein the common voltage compensator includes:

a first input terminal connected to the plurality of feedback lines, the first input terminal receiving the variation of the common voltage from the plurality of feedback lines;

a second input terminal connected to a reference common voltage;

a capacitor that supplies the variation of the common voltage received from the plurality of feedback lines to a first node of the common voltage compensator;

an inversion amplifier that outputs a compensated common voltage by inverting and amplifying the variation of the common voltage at the first node in accordance with the reference common voltage inputted to the second input terminal; and an output terminal connected to the common lines, the output terminal outputting the compensated common voltage to the plurality of common lines.

13. The in-cell type touch liquid crystal display device of claim 1, wherein the plurality of feedback lines are a substantially same length.

14. The in-cell type touch liquid crystal display device of claim 1, wherein the variation of the common voltage is stored in a capacitance formed between the common electrodes and the plurality of feedback lines that overlap the common electrodes.

* * * * *